July 3, 1928.
F. S. CARR
1,675,790
FASTENER
Original Filed Feb. 26, 1925
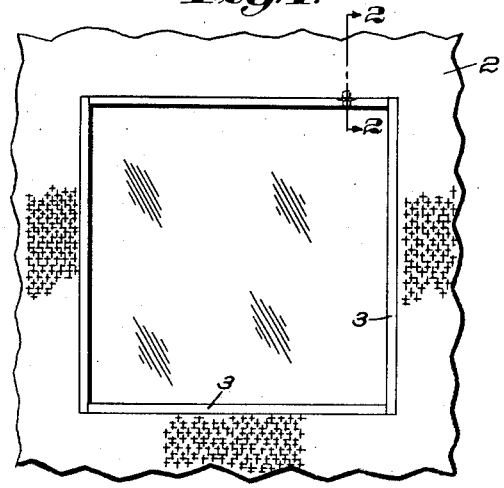
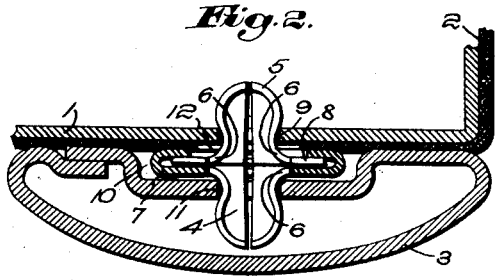
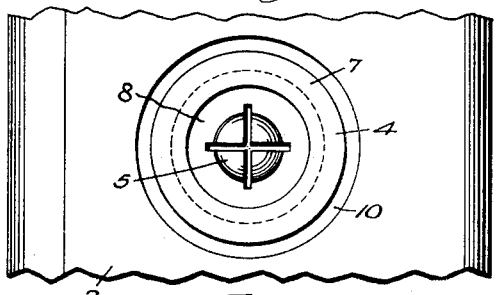
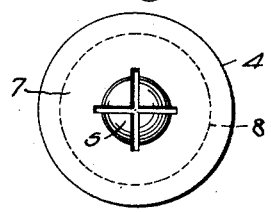
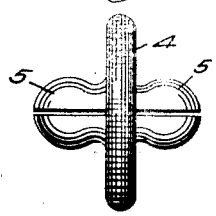
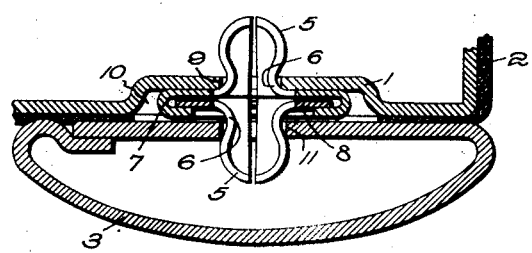
Inventor:
Fred S. Carr,
by Emery North Jenney + Varney
Attys.

Patented July 3, 1928.

1,675,790

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Original application filed February 26, 1925, Serial No. 11,698. Divided and this application filed August 25, 1925. Serial No. 52,320.

This invention aims to provide an improved fastener stud unit.

The application is a division of my prior application, Serial No. 11,698, filed February 26, 1925.

In the drawings, which illustrate two preferred embodiments of my invention:—

Figure 1 is an elevation view of a window and window frame of a vehicle body or the like, showing one use of my invention;

Fig. 2 is a section on the line 2—2 of Fig. 1, showing the trim strip secured to the window frame by stud and socket fastening means;

Fig. 3 is a plan view of a portion of the trim strip showing a stud unit secured thereto;

Fig. 4 is a plan view of a stud unit for use with a trim strip;

Fig. 5 is a side elevation of the stud unit illustrated in Fig. 4. and

Fig. 6 is a section similar to Fig. 2, the stud being reversed and showing a depressed portion in the frame part for receiving the casing part of the stud unit.

Referring to the embodiment of my invention illustrated in Figs. 1 through 5 of the drawings, I have shown a trimming installation particularly, though not exclusively, useful in automobile body construction. The installation illustrated includes the body or frame part 1 which, in some instances, may be covered with upholstery 2 (Fig. 2), the trim strips 3 and a plurality of reversible double headed stud units 4 for securing the trim strips to the frame part 1.

Trim strips or finishing strips for automobile body work have heretofore usually been constructed of wood and secured to the frame part by screws, nails or the like. While wooden trim strips may be used in connection with my invention, I prefer to provide metal trim strips 3 (Fig. 2), which are hollow and are pressed from single pieces of metal. These strips are strong, durable, neat in appearance and can be made quickly and very inexpensively.

The stud units are of a novel construction and include two substantially similar socket-engaging stud parts, each of which is provided with a contractible and expansible head 5 and a neck 6. The base portion of one of the studs provides a casing 7 which contains the base 8 of the other stud member. The inside diameter of the casing 7 is larger than the diameter of the base 8 so that each stud member shifts relative to the other, for purposes more fully hereinafter described.

The body part 1 is prepared to receive the trim strip by providing therein a plurality of stud-receiving apertures 9. Likewise the trim strips 3 are provided with depressed portions or pockets 10 and stud-receiving apertures 11 which may be formed at the inner face of the strip at the same time that the strip is formed.

In assembling the installation, the upholstery, if used, is first stretched over the frame part, and holes 12 formed therein to expose the stud-receiving apertures 9 presented by the frame. The stud units may then be secured to the frame part 1 by forcing one of the heads 5 of each stud-unit into an aperture 9. Each casing 7 overlies and seats against the upholstery to hold it in place. If desirable, the stud units may be secured to the trim strips 3 in the first instance instead of the frame. The trim strips 3 are thereafter secured to the body part 1 by pressing the remaining unengaged heads of the stud-units into the remaining stud-receiving apertures so that the strip will be pulled tightly against and conceal the edge of the upholstery. During engagement of the stud heads in the apertures, each stud part may shift laterally relative to its cooperating stud part if necessary for alignment with its cooperating aperture in either the frame part 1 or the strip 3. The pockets 10 receive the casing portions 7 of the stud units (Figs. 2 and 3) so that the inner face of the trim strip 3 may lie close to the frame part, there being no space between except that taken up by the upholstery 2 if there be any. Thus I have provided a trim strip installation which may be easily and quickly assembled and disassembled.

Referring now to Fig. 6, I have shown my invention as it appears when the stud unit is reversed. In this instance, the stud head that engaged the trim strip 3, as shown in Fig. 2, is shown engaging the body part 1 and the pocket 10 is formed in the frame part 1 instead of in the trim strip 3.

Assembly of the parts of the installation is substantially the same as described in connection with Figs. 1 through 5.

While I have shown and described preferred embodiments of my invention, it will be understood that changes involving omission, substitution, alteration and even reversal of parts may be made without departing from the scope of my invention, which is best defined in the appended claims.

I claim:

1. A separable fastener unit comprising, in combination, two socket-engaging stud members secured together at their bases and means permitting substantial lateral shifting movement of each stud relative to the other for alignment with their respective stud-receiving apertures.

2. A separable fastener unit comprising, in combination, two socket-engaging stud members, each presenting a head and neck of similar proportions, and one of said stud members having a base portion providing a casing for the base of the other stud member, said base being freely shiftable laterally in said casing.

3. A fastener stud unit comprising, in combination, two socket-engaging stud members facing in opposite directions and being shiftable laterally relative to each other, said stud members presenting base portions secured together to maintain said stud members in assembled relation while permitting said shifting movement.

4. A fastener stud unit comprising, in combination, two socket-engaging stud members facing in opposite directions, at least one of said studs being resilient and each stud presenting a head, a neck and a base portion, the bases of said studs being secured together to provide a casing in which the base of one stud is shiftable laterally in any direction thereby to permit one stud to be shifted relative to the other stud.

In testimony whereof, I have signed my name to this specification.

FRED S. CARR.